(12) United States Patent
Zimmerman et al.

(10) Patent No.: US 10,085,419 B2
(45) Date of Patent: Oct. 2, 2018

(54) MODULAR LIVESTOCK FEED SYSTEM FOR MEASURING ANIMAL INTAKE AND MONITORING ANIMAL HEALTH

(71) Applicant: C-LOCK INC., Rapic City, SD (US)

(72) Inventors: Patrick R. Zimmerman, Rapid City, SD (US); Robert Scott Zimmerman, Rapid City, SD (US)

(73) Assignee: C-LOCK INC., Rapid City, SD (US)

( * ) Notice: Subject to any disclaimer, the term of this patent is extended or adjusted under 35 U.S.C. 154(b) by 184 days.

(21) Appl. No.: 15/208,875

(22) Filed: Jul. 13, 2016

(65) Prior Publication Data

US 2017/0013802 A1    Jan. 19, 2017

Related U.S. Application Data

(60) Provisional application No. 62/191,630, filed on Jul. 13, 2015.

(51) Int. Cl.
*A01K 5/01* (2006.01)
*A01K 29/00* (2006.01)
(Continued)

(52) U.S. Cl.
CPC .......... *A01K 5/0107* (2013.01); *A01K 1/0209* (2013.01); *A01K 11/006* (2013.01);
(Continued)

(58) Field of Classification Search
CPC .......... A01K 5/01; A01K 5/0107; A01K 5/02; A01K 5/025; A01K 5/0275; A01K 5/0283; A01K 5/0291; A01K 1/10; A01K 11/006
(Continued)

(56) References Cited

U.S. PATENT DOCUMENTS 4,830,010 A    5/1989    Marshall
4,953,504 A *  9/1990    Taylor .................. A01K 5/0233
                                                    119/53.5
(Continued)

FOREIGN PATENT DOCUMENTS

KR    20060019062 A    3/2006
WO       0126482 A1    4/2001
(Continued)

*Primary Examiner* — Joshua D Huson
(74) *Attorney, Agent, or Firm* — Marsh Fischmann & Breyfogle LLP; Kent A. Lembke

(57) ABSTRACT

A livestock feed system adapted to be modular and readily scalable from one bin assembly to multiple bin assemblies that can be communicatively networked together. The system includes a stainless steel feed bin with an opening on a first surface of the one or more sidewalls for receiving an animal head. The feed bin further includes an access door on a second surface of the one or more sidewalls that is pivotally, slidably, or removably coupled to adjacent portions of the one or more sidewalls to allow easy cleaning of the bin. The system includes a portable support frame supporting the feed bin, and a controller mounted on the support frame. The controller includes a self-contained computer with a processor executing code (programs or software) to provide an animal monitoring and management module that causes the controller to determine intake by an animal accessing the feed bin through the opening.

21 Claims, 9 Drawing Sheets

(51) Int. Cl.
*A01K 11/00* (2006.01)
*G06K 7/10* (2006.01)
*H04W 4/80* (2018.01)
*A01K 1/02* (2006.01)
*A01K 1/10* (2006.01)

(52) U.S. Cl.
CPC ........ *A01K 29/005* (2013.01); *G06K 7/10009* (2013.01); *G06K 7/10366* (2013.01); *H04W 4/80* (2018.02); *A01K 1/105* (2013.01)

(58) Field of Classification Search
USPC .................................................. 119/61.1, 60
See application file for complete search history.

(56) References Cited

U.S. PATENT DOCUMENTS

| | | | |
|---|---|---|---|
| 5,265,618 A | 11/1993 | Zimmerman | |
| 5,979,359 A * | 11/1999 | Hansson | A01J 5/0175 |
| | | | 119/14.01 |
| 6,270,462 B1 | 8/2001 | Mottram et al. | |
| 6,427,627 B1 * | 8/2002 | Huisma | A01K 5/02 |
| | | | 119/51.02 |
| 6,488,635 B1 | 12/2002 | Mottram | |
| 6,497,197 B1 * | 12/2002 | Huisma | A01K 5/02 |
| | | | 119/75 |
| 6,743,440 B1 | 6/2004 | Ballinger, Jr. | |
| 6,868,804 B1 * | 3/2005 | Huisma | A01K 11/006 |
| | | | 119/51.02 |
| 7,234,421 B2 * | 6/2007 | Natividade | A01K 11/008 |
| | | | 119/174 |
| 7,350,481 B2 | 4/2008 | Bar-Shalom | |
| 7,681,525 B1 * | 3/2010 | Trulove | A01K 5/01 |
| | | | 119/58 |
| 7,966,971 B2 | 6/2011 | Zimmerman | |
| 8,149,094 B2 * | 4/2012 | Deoalikar | G06K 7/0008 |
| | | | 340/10.2 |
| 8,307,785 B2 | 11/2012 | Zimmerman et al. | |
| 8,433,593 B2 * | 4/2013 | Stroman | G06Q 10/063 |
| | | | 705/7.11 |
| 8,866,605 B2 * | 10/2014 | Gibson | A01K 11/006 |
| | | | 340/539.1 |
| 9,345,231 B2 * | 5/2016 | Jalbert | A01K 5/02 |
| 9,848,577 B1 * | 12/2017 | Brandao | A01K 11/004 |
| 9,980,467 B2 * | 5/2018 | Auer | A01K 29/005 |
| 2002/0010390 A1 * | 1/2002 | Guice | A01K 11/008 |
| | | | 600/300 |
| 2004/0074448 A1 * | 4/2004 | Bunt | A01K 11/006 |
| | | | 119/421 |
| 2004/0150528 A1 * | 8/2004 | Natividade | A01K 11/008 |
| | | | 340/573.3 |
| 2006/0070578 A1 * | 4/2006 | Pavlik | A01K 5/01 |
| | | | 119/51.11 |
| 2007/0137584 A1 * | 6/2007 | Travis | A01K 5/02 |
| | | | 119/51.02 |
| 2007/0181068 A1 * | 8/2007 | McKeown | A01K 5/02 |
| | | | 119/51.02 |
| 2009/0031961 A1 * | 2/2009 | Pratt | A01K 1/0023 |
| | | | 119/51.02 |
| 2009/0285931 A1 | 11/2009 | Shelby et al. | |
| 2012/0089340 A1 * | 4/2012 | Huisma | A01K 5/02 |
| | | | 702/19 |
| 2012/0294876 A1 * | 11/2012 | Zimmerman | A61B 5/082 |
| | | | 424/184.1 |
| 2013/0006065 A1 * | 1/2013 | Yanai | G06F 19/3418 |
| | | | 600/300 |
| 2014/0074742 A1 * | 3/2014 | Pratt | A01K 29/00 |
| | | | 705/333 |
| 2014/0155756 A1 * | 6/2014 | Elazari-Volcani | |
| | | | G06F 19/3418 |
| | | | 600/476 |
| 2015/0181838 A1 * | 7/2015 | Epema | A01K 5/02 |
| | | | 119/52.1 |
| 2015/0182322 A1 * | 7/2015 | Couse | G01K 1/20 |
| | | | 600/549 |
| 2015/0282457 A1 * | 10/2015 | Yarden | A01K 29/005 |
| | | | 340/573.2 |
| 2016/0100802 A1 * | 4/2016 | Newman | G06F 19/3418 |
| | | | 600/301 |

FOREIGN PATENT DOCUMENTS

| | | |
|---|---|---|
| WO | 2004072801 A2 | 8/2004 |
| WO | 2009013002 A2 | 1/2009 |
| WO | 2009151927 A2 | 12/2009 |

* cited by examiner

MODULAR LIVESTOCK FEED SYSTEM FOR MEASURING ANIMAL INTAKE AND MONITORING ANIMAL HEALTH

CROSS-REFERENCE TO RELATED APPLICATIONS

This application claims the benefit of U.S. Provisional Application No. 62/191,630 filed on Jul. 13, 2015, which is incorporated herein by reference in its entirety.

FIELD OF THE DESCRIPTION

The present description is generally directed toward animal (e.g., livestock such as beef cattle, dairy cows, sheep, and the like) feed systems, and, more particularly, the description is directed to a modular livestock feed system that is configured for ongoing and remote monitoring of the health of individual animals within a herd including monitoring and controlling intake of feed and supplements on an animal-by-animal basis.

BACKGROUND

Accurate measurements of animal feed intake can greatly improve the efficiency of animal agriculture. Intake measurements can be used along with measurements of weight gain and/or milk production to identify individual animals in a herd that are more efficient in converting feed into useful products such as meat or milk. Intake measurements can also be used to identify sick animals during critical transitions. In beef cattle, the transition from weaning to grazing and the transition from grazing to feedlot finishing are both critical times when animals can be vulnerable to problems that affect long term health and productivity. In dairy cows, the transition from the dry period to the period of high milk production is an especially critical time when early indications of health problems can determine the animal's milk production and survival. In modern dairies, each year approximately eighteen percent of the animals are culled due to health issues that arose during this transition period. The percentage of the herd that is culled or dies at this stage of lactation has risen from four to five percent in 2005 to over six percent by 2010.

Measurements of individual animal intake can provide the early warning necessary for successful treatment and avoidance of animal losses. However, current commercial systems to monitor individual animal intake are expensive to install, require rigid placement and extensive networking, and are constructed of fiberglass or plastics that are expensive to ship and difficult to clean, e.g., with high-pressure power washing equipment, without damage.

With regard to these current commercial systems, several companies currently market animal feed intake systems, but none of these companies systems have met all the demands of the industry. For example, existing commercial systems typically employ a plastic or fiberglass feed bin, which is placed on a rigid frame containing two support rails onto which are mounted load cells, and these bins cannot typically be washed with high-pressure power washing equipment or with many readily available cleaning solutions.

In existing systems, animals are each equipped with an RFID tag either mounted within a plastic block attached to a collar that is placed around the animal's neck or animals are equipped with a plastic ear tag that is equipped with a passive radio frequency identification device (RFID ear tag). Some systems require a half-duplex tag while other systems can utilize both half-duplex and full duplex tags. These bins are sold in multiple units that are linked through wiring so they can operate without interfering with each other. In operation, typically when an ear tag is read, the weight of the feed bin and its contents is recorded. When the ear-tag ceases to be read, the weight of the feed bin and its contents is again recorded. The loss of weight is then used to estimate intake for that animal for that specific time-period. Some systems attempt to correct for weight that could have been added due to rain or to saliva from the animal being deposited on the feed. Some systems use proprietary methods for calculating weight loss. In one exemplary method, the changes in the beginning weight over a unit of time when an animal is not present is used to estimate the change in the background weight and averaged into the feed intake calculation. However, there is no evidence documented in the scientific literature to indicate that this averaging procedure produces more accurate results such that there is a need for livestock feed systems with control or monitoring devices that more accurately determine intake of each animal feeding at the system.

Some intake systems set a minimum time that the animal must be in position to consume feed, either measured by RFID tag reads or measured independently using an interrupted light beam before a feeding bout is registered and weighed. This time requirement may not be desirable in many applications. Each of these systems transfers data through a wired interface to a data-logger or a computer where data is tabulated for future processing and later display. Connecting each unit together through wiring to create a network is necessary because for these systems independent units operating in close proximity to each other may cause interferences, primarily in the RFID readers, that prevent proper operation of individual units in the network. Hence, such systems can be complex to install and are not typically modular or readily scalable up and down in size.

Feed intake systems generally also include some type of gate or barrier designed to prevent one animal from accessing the feed and another from pushing the first animal out and "stealing" its feed. These gate systems can be as simple as a series of vertical bars placed the appropriate distance apart at the central opening so that only one animal at a time can access the bin. Sometimes a horizontal bar is located on the gate so that the animal must insert its head below the bar to access the feed, and the bar is placed to prevent the animal from tossing the feed ration and/or from quickly backing out if harassed by another animal. Other systems simply include an opening shaped like a keyhole or even just a 'V" shape so that only one animal can access the feed and that it cannot easily back out without lifting its head. Sometimes intake measurement systems restrict each specific animal to a designated feed bunk. The restricting device is often a Calan Gate (available from American Calan, Northwood, N.H., USA) that will only unlock and swing open when a specific ear tag is read. In some systems, gates that either swing open or that slide upwards from below the feed bin can be added and controlled to provide access to the feed bin by specific animals at designated times of the day for designated periods of time.

In use, residual feed remaining in the feed bunk or bin must be periodically removed. This is because residual feed when contaminated by moisture or saliva can become moldy and otherwise unpalatable. In the current systems on the market, the bins are emptied using a shovel and dustpan to remove the orts. Usually, the whole bin can be tipped up on one side to make this task less difficult. However, individual bins are heavy, and lifting the feed bunks for cleaning in a system with many intake units is an onerous, time-consuming task.

At specified intervals, such as when a new group of animals is to be measured, each bin is also typically thoroughly scrubbed and decontaminated. Plastic bins require hand scrubbing with brushes and thorough rinsing to remove contamination caught in deep scratches or absorbed into the plastic. Fiberglass bins must be carefully scrubbed with a cleaner that does not contain aggressive abrasives, which makes cleaning more difficult. In addition, cleaners are required to decontaminate the often pitted surfaces of the bins from harmful microorganisms and other disease agents. Care must be taken in order to minimize the introduction of difficult to sanitize scratches into plastic and composite materials. Further complicating the cleaning effort, waste material resulting from cleaning and decontamination of intake bins may have to be separated from the normal manure-handling waste-stream. Cleaning is made more difficult because plastic and composite surfaces of current intake monitoring systems are not thermally stable and are, therefore, incompatible with the use of steam for decontamination and cleaning. With existing bins of livestock feed systems, heat and chemicals can accelerate delamination and dimensional instability of feed bins. After extended use, both plastic and fiberglass bin materials exhibit significant cracks, pitting, and surface roughness making decontamination difficult, which may in many cases require replacement of the bins.

The installation of feed intake systems currently in use in the animal industry requires careful planning and extensive infrastructure, and the number and locations of intake feed bunkers or bins must be specified in advance of installation. Typically, cattle must be removed from the pens where the equipment is to be installed. Next, earth must be moved to provide the recommended drainage and a stable platform for concrete forms. Then, concrete forms are built, and concrete is poured. The next step involves installing wiring for electricity and for data collection and transmission and for control functions into a system of conduits that are routed to each unit from a dedicated computer system that is placed remote to the feed bins so as to be in a relatively clean and dry environment with stable power so that this "control and processing" computer can reliably operate without interruption.

Installation further includes installing and routing power and, often, pneumatic lines to each feed bunk. The final step is the installation, calibration, and testing of each feed bunk and of the entire integrated system including weighing systems, animal control systems, data-handling systems, data monitoring and display systems, and auxiliary power stabilization, filtering, and backup systems. It is especially important as part of installation to adjust the timing of the RFID readers so that they do not interfere with one another or with on-site equipment that could produce interfering noise. In several use cases or applications, commercial intake measurement systems were not able to operate in proximity to the other livestock feed systems. For example, some systems use a propriety method to synchronize units that can be incompatible with systems that employ international standards. Therefore, synchronization of the two systems may not be readily attained. After calibration, animals can be reintroduced into the feed pens, and the process of training animals to utilize the feed bunks can begin. This process typically extends over approximately twenty-one days, and the period of actual measurements usually extends seventy-five days or more for each group of animals that is monitored, depending on the purpose of the measurement program.

SUMMARY

A modular livestock feed system is described herein that addresses one or more of the problems associated with existing livestock feed systems. For example, the inventors recognized that the material of choice for the feed bin of the livestock feed system logically would be stainless steel due to the ability for it to withstand pressure-washing, its resistance to becoming imbedded with difficult to remove microbial contamination, and its impermeability to potentially harmful cleaning agents. It was further recognized by the inventors that in all cattle intake systems currently on the market the feed bin is plastic or fiberglass, and these materials represent a compromise because a metal feed bin, as taught by the inventors for their feed system, is thought by prior system designers to interfere with the detection range of RFID readers used in these systems. Stainless steel is a preferred material for animal contact surfaces because it is impermeable, tough, and readily cleaned (e.g., quickly and more easily with a pressure-washer and sanitized using steam equipment creating no residual waste disposal problems). In addition, a steel bin's smooth surface is easy to rinse to remove residual chemicals introduced during cleaning. Prior to the livestock feed systems described herein, however, stainless steel was not often used because of the expense and because the RFID sensors in current commercial feed intake bunks or bins may not function properly if metallic materials are in proximity to the reader antenna (e.g., use of a steel such as stainless steel is counterintuitive based on prior system designs).

More particularly, a livestock feed system is provided that is adapted to be modular and readily scalable from one bin assembly to multiple bin assemblies that can be communicatively networked together. The system includes a feed bin including a base and one or more sidewalls engaging edges of the base and extending away in a single direction (e.g., vertically or at an angle from the base to define a space for receiving feed that may have a rectangular cross sectional shape). The feed bin includes an opening on a first surface of the one or more sidewalls for receiving an animal head. The feed bin further includes an access door on a second surface of the one or more sidewalls that is pivotally, slidably, or removably coupled to adjacent portions of the one or more sidewalls. The access door blocks access to an interior space defined by the one or more sidewalls when in a closed position and provides access to the interior space when in an open position. The base and the one or more sidewalls may be stainless steel panels. The system also includes a support frame for receiving and supporting the feed bin (e.g., a portable frame that does not require a concrete or similar pad for stable installation). The system also includes a controller mounted on the support frame, and the controller includes a self-contained computer with a processor executing code (programs or software) to provide an animal monitoring and management module that causes the controller to determine intake by an animal accessing the feed bin through the opening.

In some embodiments, the one or more sidewalls include a front sidewall containing the opening, a rear sidewall including the access door, and right and left sidewalls. The right and left sidewall may extend from a first end distal to the base to the edges of the base at an angle in the range of 15 to 45 degrees (e.g., to be sloping inward to allow receipt in an upper opening/space in the support frame as the base is smaller in area than the opening for imputing feed at an opposite end from the base). The feed bin is supported by spaced apart first and second members of the support frame with abutting contact with the right and left sidewalls. The system also includes a pair of load cells positioned on the first and second members of the support frame to mate with the feed bin, and the animal monitoring and management module determines the intake by determining a difference between feed bin weight prior to the animal accessing the feed bin and feed bin weight after the animal accessing the feed bin.

In the same or other embodiments, the controller includes networking electronics, and the animal monitoring and management module is programmable via a memory device removable from the controller or remotely through a wireless communication with the networking electronics. The controller includes memory and an RFID reader reading an RFID tag worn by the animal accessing the feed bin, and the animal monitoring and management module stores in the memory a record including an ID of the animal from information read from the RFID tag by the RFID reader and including the intake. The system may include one or more sensors in or proximate to the feed bin collecting at least one of breath-based data, lameness data, fly monitoring data, coughing and wheezing data, animal temperature, and animal weight. The animal monitoring and management module stores in the record entries associated with data from the one or more sensors. The RFID reader is wirelessly time synchronized with one or more additional RFID readers associated with additional feed bin controllers to control interference between the RFID reader and the additional RFID readers.

The system may also include a control gate mounted for pivoting between a closed position blocking the opening and an open position allowing access to the opening and the feed bin. In such embodiments, a gate positioning mechanism or assembly may be included that is selectively operable by the controller to move the control gate between the open and closed positions to control access to the feed bin. To this end, the controller selectively positions the control gate based on a determination by the animal monitoring and management module of one of animal ID, length of present access to the feed bin, present time, and present date.

DETAILED DESCRIPTION

Figure 1:
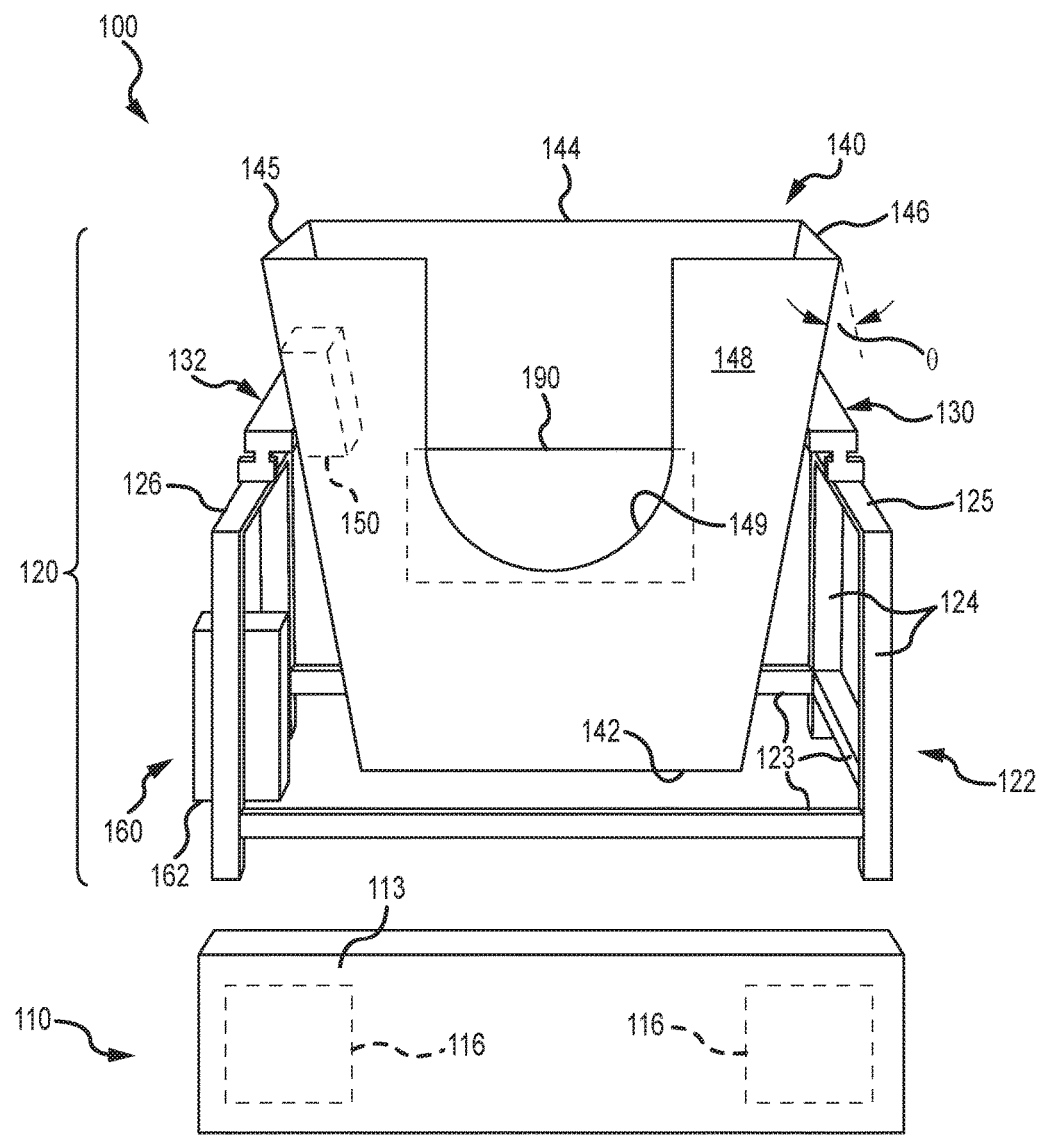
FIGS. 1 and 2 illustrate, respectively, front and side views of a livestock feed system of the present description.

Briefly, a modular livestock feed system is described that is particularly well suited for feeding, monitoring, and managing a herd of animals and individual animals within the herd to enhance the output (meat, milk, and the like) and health of the animals. The inventors recognized that one reason the new livestock feed system is valuable within the livestock industry is that the system with its feed bins entices animals to visit a specific spot or location at useful time intervals so that animal (or herd) management functions can be performed in a very low-stress (e.g., voluntary) environment.

The monitoring/management functions or services that may be performed by the new system include, but are not limited to: (1) directly monitoring animal intake direct; (2) dispensing supplements that are precisely tailored to each animal with respect to its age and growth cycle (or other parameters); (3) monitoring an animal's breath components and estimating intake in the field from the gases emitted; (4) weighing each animal when a scale is provided in front of each "smart" bin assembly of the livestock feed system; (5) monitoring fly infestations and applying optimal amounts of fly-control agents at optimal time intervals to minimize the release of pesticides to lessen the development of resistance to the fly-control agents by flies; (6) monitoring the animal's temperature by scanning its eyeball while it is eating in a bin or through a wireless (e.g., Bluetooth or the like) connection to temperature sensors mounted on or in the animal; (7) monitoring each animal for coughing and wheezing that can be indicative of respiratory viral disease (which is a problem for feedlots); and (8) checking an animal for lameness through the use of individual pressure sensors such as may be embedded in a weigh scale. Other services or functions can be added to the system to allow masses of animals to be managed with individual precision. As will be recognized, the livestock feed system is useful in this regard simply because it gets animals to pause periodically at a specific place where they can be individually identified and treated in a voluntary but precise way.

The livestock feed system addresses a number of problems or shortcomings with prior animal intake systems. First, the plastic and the resin material of feed bins is not ideal for heavy use and cleaning in the harsh environments encountered in animal agriculture. The major disadvantages are: (a) pre-formed bins are bulky and relatively expensive to ship; (b) careful cleaning is required to avoid scratches from which it is difficult to remove contamination; (c) pressure-washing with high-pressure water and steam cleaning are not recommended because they may delaminate the material and they may also accelerate unwanted sagging and dimensional changes in the intake bunks; and (d) residual waste containing cleaning and sterilizing agents must be handled carefully and often must be treated separately from other waste streams.

A second problem involves removing orts and residual feed as with prior intake systems this requires heavy-lifting to tip the entire feed-bunk on end. Feed bunks can be heavy and difficult to handle. Caked-on feed must be carefully removed to prevent scratches. Ice and snow must be carefully scraped loose. The use of heat from torches or heat guns can easily warp, melt, crack, and/or otherwise damage plastic and fiberglass surfaces.

A third problem is that installation requires rigid, permanent support-structures. Also, networked systems require extensive wiring and often installation of pneumatic lines from a central location to each feed bunk. It is difficult to add units to a pre-configured network. Once wiring is in place modification is difficult and expensive. Feeding areas and pens can be difficult to modify to accommodate changing needs. Modifying the system to accommodate various networking options and needs can be complicated and often requires specialized staff. The modification process is often time-consuming and expensive. Reprogramming for changes in data-handling and processing requirements can be difficult. A central computer for command, control, and data-handling is required. This remote computer must be placed in a relatively-clean and temperature and moisture-controlled environment, and the computer must be able to access continuous line-power. The entire system is vulnerable to failure of one critical component in one feed bunk because of the networked configuration.

A fourth shortcoming of prior designs (or set of shortcomings) was that the feed intake systems are: (a) expensive to install; (b) expensive to maintain; (c) expensive to operate; (d) expensive to modify to meet evolving needs; and (e) often unreliable. A fifth problem with prior intake system designs is that the RFID readers positioned within each bin, unless synched with each other, may interfere with each other and/or with other equipment in proximity of the intake bunks. The wires connecting each RFID antenna to the readers are cumbersome or even impossible to move as several bins are often linked to one RFID reader and several antennas.

Figure 2:
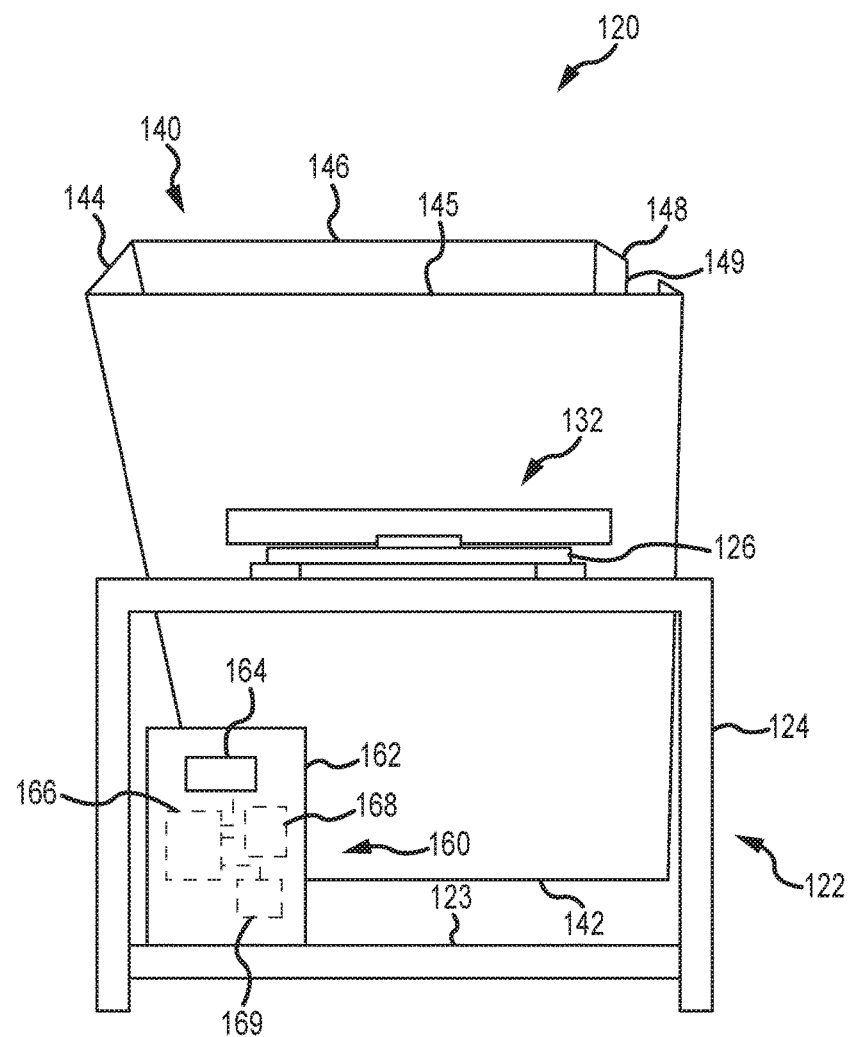

FIGS. 1 and 2 illustrate, respectively, front and side views of a livestock feed system 100 of the present description. The system 100 includes a scale 110 and a bin assembly 120. The system 100 is adapted to be modular, as discussed further below, such that the use of one assembly 120 is only exemplary but the system 100 may be modified or expanded to include 2, 3, 4, or more bin assemblies 120 that may be arranged in any order. The system 100 would be positioned in any desirable position where one or more animals (e.g., dairy cows, beef cattle, sheep, and so on) may be located so as to facilitate monitoring and managing such animals on an individual or animal-by-animal basis.

As shown, the system 100 includes a scale 110 that is positioned adjacent the bin assembly 120 such as in front of an opening 149 to be located where an animal would use the bin assembly 120 to feed. The animal (not shown) would feed at the assembly 120 while standing with two or more of its hooves/feet upon the upper surface 113 of the scale 110, which would respond by sensing a weight of the animal. The scale 110 is wirelessly (or wired in some cases) linked to the assembly 120 (e.g., to the controller 160) to respond to the presence of an animal by transmitting a signal to the assembly 120 to provide the measured or sensed weight of the animal.

Further, to assist in lameness determination, the scale 110 is shown to include two or more pressure sensors 116 at spaced apart locations, e.g., approximate locations of where hooves/feet of an animal will be located during its presence/feeding at the bin assembly 120. The pressure sensors 116 transmit data ("lameness data") to the controller 160 for processing to identify potentially lame or injured animals that need attention. For example, the lameness data from sensors 116 may indicate that the animal is applying significantly less weight on the scale 110 via one of its legs as much less pressure is sensed at the location of one of the sensors 116 than the others, and this is an indication that the animal is lame or has an injury.

The bin assembly 120 includes a support frame 122 with a set or number of legs 124, which may be three or four (as shown) or more elongated members that are arranged vertically (or substantially vertically) and which may have circular cross sections, square cross sections, or the like. Further, the support frame 122 includes lower arms or struts 123 and upper arms or struts 125 (spaced apart from lower arms 123) extending horizontally or generally horizontally between the vertical legs 124, with four lower arms 123 and three arms 125 shown to allow unblocked or unobstructed animal access to the opening 149 in the bin 140 while providing a structurally stable and strong support structure.

The bin assembly 120 further includes a pair of load cells (or weight sensing components) 130, 132 mounted upon upper surfaces of an opposite pair of the upper arms 125 of the support assembly 122. The load cells 130, 132 are selected and/or configured to sense a load or weight applied to their upper or exposed surfaces and to communicate in a typically wireless manner (but wired configurations are also useful) to the controller 160 sensed loads that are processed to determine a weight of an object resting on top of the two load cells 130, 132.

In this regard, the bin assembly 120 includes a feed bin or bunk 140 positioned upon the two load cells 130 such that its weight can be sensed and determined by the assembly 120. The bin 140 includes a bottom wall or base 142, which is sized and shaped (e.g., as a rectangle, square, or the like) to fit within the opening defined by the upper support arms 125 and 126 and between the two load cells 130, 132. The bin 140 also includes four sidewalls extending at an angle from the base 142 such that the upper opening of the bin (defined by edges of the sidewalls opposite to the base 142) is similarly shaped (e.g., a rectangle) but greater in size. As shown, the sidewalls include a back or rear sidewall 144, left and right (and spaced apart and opposing) sidewalls 145, 146, and a front or forward sidewall 148, and each of the sidewalls 144, 145, 146, and 148 is interconnected (in a sealed manner to retain feed) at the sides or edges abutting to adjacent ones of the sidewalls 144, 145, 146, and 148.

The front sidewall 148 has an opening 149 provided in it for receiving an animal's head during feeding or to allow the animal to readily access feed supported by the base 142 in the bin 140. The opening 149 may be U-shaped and positioned on the sidewall 148 so as to extend from the upper end or end opposite the base 142 toward a center portion of the sidewall 148. The sizing and shape of the head opening 149 may vary to suit particular animals (e.g., larger for cattle and dairy cows than for sheep and so on) and to suit the height of the sidewalls 144, 145, 146, 148 (e.g., have a height that is 30 to 60 percent of the sidewall height). The sidewalls 144, 145, 146, 148 may be sized to provide a bin 140 with a desired feed capacity (with feed being limited to being below the lower edge of the opening 149).

The left and right sidewalls 145, 146 are shown to extend from the open or upper edges to connect to the base 142 at an angle, θ, that is chosen to allow the bin 140 to be readily fit into/received within upper opening of the support frame 122 and so as to come to rest upon and be supported by the load cells 130, 132. In some embodiments, the angle, θ, is chosen from the range of 15 to 45 degrees (with an angle, θ, of about 30 degrees being shown). The bin 140 is retained in the assembly 120 by the weight of the bin 140 (and any contained feed) and is not affixed to the support frame 122 in most embodiments, and this allows ready cleaning and maintenance as the bin 140 can be lifted out and removed from the bin assembly 120. Typically, the support frame 122 is also not affixed to the ground or a floor such that it is portable and can be moved from location to location by an operator of the livestock feed system 100.

The bin assembly 120 further includes a controller 160 that is attached to and supported by the support frame 122. To this end, the controller 160 includes a housing (e.g., an electronic box) 162 that is mounted on one of the lower arms 123 in the example shown in FIGS. 1 and 2, and this housing 162 is chosen to be durable (e.g., corrosion resistant) and water tight (or at least leak resistant). On one side of the housing (such as an outward facing side), a display screen or digital readout 164 is provided that can be operated to display monitoring information (e.g., weight of the bin 140 or feed within the bin) and/or controller status information (e.g., battery life, sensor status, communication link status, and so on).

The controller 160 includes a self-contained computer 166 within the housing 162 that operates to control the display screen/readout device 164 to provide information to an operator of the assembly 120. Also, a set of networking electronics 168 are provide in the controller 160 that may include a power source (e.g., battery), I/O devices including a wireless communication device (e.g., Bluetooth-enable transmitter/receiver or the like), and other devices. The network electronics 168 are operated by the computer 166 in use to communicate gathered or monitored data to a remote station (e.g., a farmer's home/office) and/or with other bin assemblies that may be networked together to provide a livestock feed system 100. The controller 160 further includes one or more readers 169 for identifying the animal that is presently using the bin 140 (e.g., is feeding at the bin 140 with its head extending through the opening 149). For example, the animal may have an RFID tag, and the reader 169 operates to read the ID data from the RFID tag on the animal and communicate this information to the computer 166 for processing along with the weight data from the load cells 130, 132.

The assembly 120 further includes a sensor (or sensors) 150 for obtaining additional data pertaining to the animal presently feeding at the bin 140 as explained in more detail below. For example, the sensor 150 may be configured for determining a temperature of the animal, for detecting a presence of flies, for sensing whether the animal is coughing/wheezing, for gathering and processing the animal's breath, and for sensing other information about the animal to support other animal monitoring services. Data collected by the sensor(s) 150 is transmitted (in a wired or wireless manner) to the computer 166 of the controller via the networking electronics 168, and the computer 166 can store this data in its memory, process the data to obtain monitoring data, and/or transmit the sensed data via the networking electronics 168 (e.g., to a central control station, to another bin assembly 120, and so on).

Figure 3:
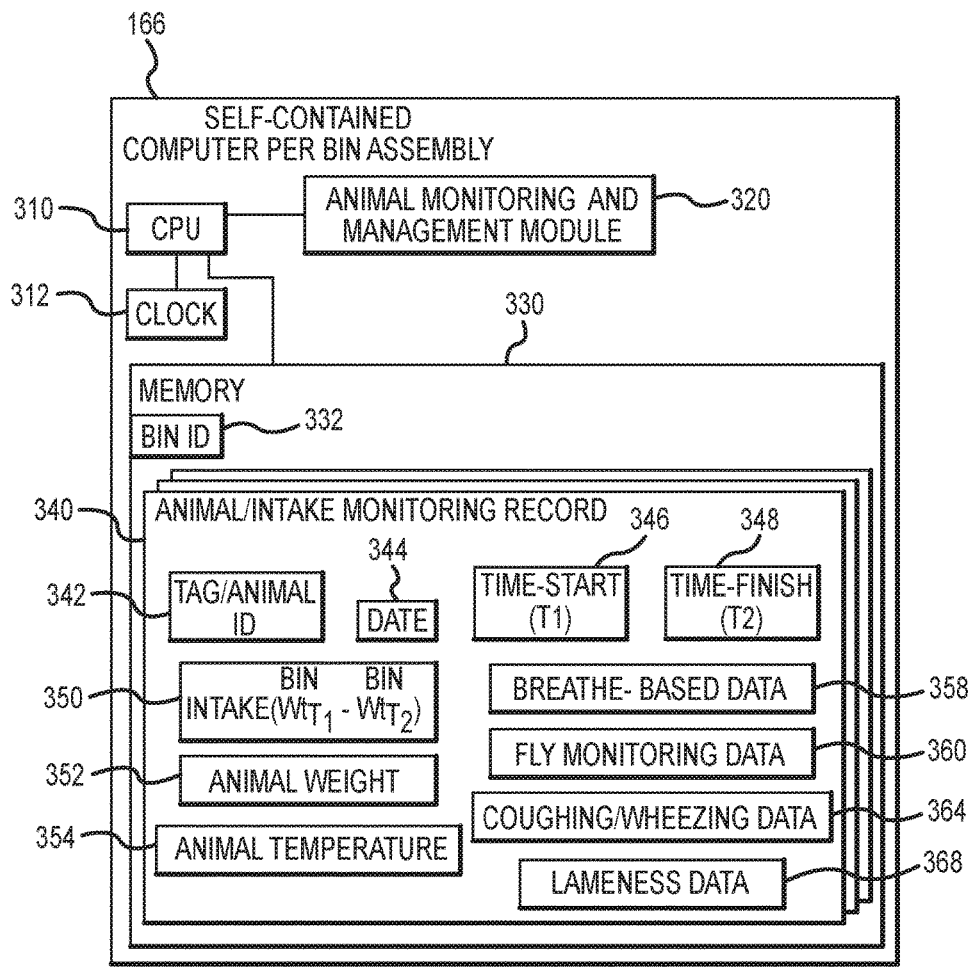
FIG. 3 illustrates a functional block diagram of the self-contained computer of an exemplary controller such as the controller of the system of FIGS. 1 and 2.

FIG. 3 illustrates a functional block diagram of the self-contained computer 160 of the controller 160 of FIGS. 1 and 2. As shown, the computer 166 includes a processor(s) 310 that is configured to execute code or software (in computer-readable storage media) to provide the functionality of an animal monitoring and management module 320. These functions are described in more detail below but include determining feed intake by an animal via the bin 140 as well as collecting, managing, and communicating the intake and other monitoring data. The computer 166 includes a clock 312 providing data and time data to the processor 310 during operation of a bin assembly 120.

The computer 166 further includes memory 330 (or data storage devices). As shown, a variety of data may be stored in the memory 330 by the processor 310 during execution of the animal monitoring and management module 320. The stored data may include a bin ID 332 for use in communicating with other bin assemblies networked together in a livestock feed system 100. The data that is stored also typically includes a plurality of animal/intake monitoring records 340. These records 340 may take a wide variety of forms and include a wide variety of data that may vary with sensors 150, but, as shown, a record 340 may include data providing a tag or animal ID 342 such as may be read by the RFID reader 169 of the controller 160. This allows each animal in a herd to be individually monitored and managed as all collected data is linked or tied to a particular animal as they access the bin 140 for feed. The record 340 may also include a date 344 as well as time information such as feed/access start time 346 and a feed/access end time 348.

The module 320 is designed to cause the processor 310 to determine and store the amount of feed eaten or the intake 350 of each animal accessing the bin 140. This may involve subtracting the weight of the bin 140 (provided by the load cells 130, 132) at the second of feed/access end time 348 from the weight of the bin 140 (provided by the load cells 130, 132) at the start time 346. The stored data in the record 340 may also include the animal's weight 352 as measured/sensed by the scale 110 as well as the animal's temperature 354 provided by one of the sensors 150 of the bin assembly 120. The stored data in the record 340 may include other useful information such as breath-based data 358, fly-monitoring data 360, coughing/wheezing data 364, and lameness data 368, all of which may be collected/sensed using the sensor(s) 150 that communicates the data during an intake/access session to the computer 166. The records 340 may be stored for some predefined time period and may be periodically transmitted to other assemblies 120 and/or to a central control station (not shown in FIGS. 1 and 2) for further processing.

In some embodiments, the support frame 122 is constructed of a high-strength, powder-coated steel to withstand harsh conditions. The intake bin 140 is usually constructed entirely of stainless steel panels (e.g., for base 142 and sidewalls 144, 145, 146, and 148). The panels can be separated and folded flat to decrease storage space requirements and to lower shipping costs. Other materials for panels or whole intake bins could be used, and these materials include plastics such as polyethylene and composites such as fiberglass. Further, a wide, easily-accessible access door 190 (which may be pivotally attached to the panel 144 with one or more hinges and closed/locked in a conventional manner) is provided, in some preferred embodiments, on the lower back panel (e.g., sidewall 144) of the bunk or bin 140 to facilitate the easy clean-out of orts, ice, and/or snow without heavy lifting of the entire bin 140 from the support frame 122.

Electronics, such as the computer 166 and networking electronics 168, are housed in a rugged water-resistant NEMA 4X Exterior-rated box 162 in some implementations. A panel 164 displaying gathered and calculated data is also included on each unit 120 so that field personnel can quickly assess operation, performance, and the amount of feed in each bin at the site of each feeder. A sophisticated ISO 11784/11785 compliant RFID reader system, e.g., the reader 169, may be included that is capable of reading ISO 11784/11785 ear tags, and this reader 169 may be configured to automatically tune out potential interference so as to provide reliable ear-tag detection even in the presence of potential interference from nearby electrical components and the stainless steel feed bunk 140. RFID collars (worn by animals and not shown in FIGS. 1 and 2) based on the ISO 11784/11785 standard can also be accommodated in some implementations of the system 100. It is believed by the inventors that the livestock feed system 100 is the first automatic feed intake system made using stainless steel feed bins 140. The access door 190 in the rear wall 144 of the feed bin 140 (opposite of the side where the animal places its head) is also unique to the system 100.

The system 100 is designed such that installation on site or in a field requires no concrete pad and no wiring to network two or more of the bin assemblies 120. The livestock feed system 100 is designed to be a modular, self-contained, and, therefore, easily-portable system to automatically monitor feed intake from individual animals. The system 100 employs an extremely rigid structural base or support frame 122 that, in some embodiments, may have an approximately one-square-meter footprint and that can be placed on virtually any firm level surface. Soft and irregular surfaces can be accommodated by driving several support rods into the ground as required (usually four rods are desirable), to which the base or support frame 122 is attached. Other alternative designs may be used to support the frame 122. These alternative designs include construction of a temporary or permanent pad of gravel, cement tiles, or poured concrete. However the installation of the livestock feed system 100 does not require construction of a permanent foundation.

The system 100 with its controller 160 is energy efficient and uses very little power. The wireless controller 160 may be a low-voltage (12 VDC) device able to operate on a wide range of available power sources. For example, the system 100 can operate on 110V or 220 V line power. Other options to provide power to operate a single assembly 120 and/or networks of assemblies 120 include renewable energy generators utilizing solar or wind power. Additionally, combinations of solar panels, batteries, and generator power can be utilized as required.

Figure 4:
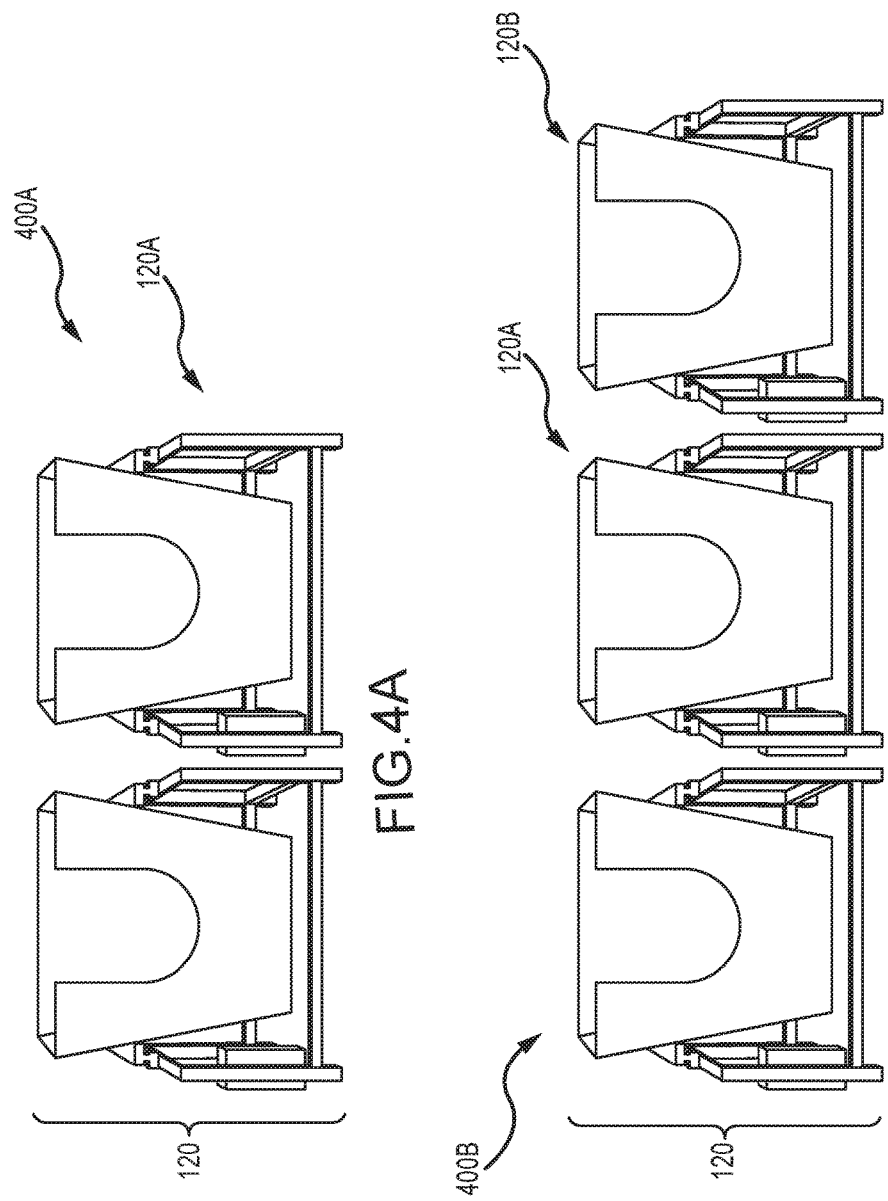
FIGS. 4A and 4B show additional implementations of livestock feed systems including, respectively, two and three of the bin assemblies shown in more detail in FIGS. 1-3.

The system 100 does not require any wiring or placement of conduits for electrical, data, and pneumatic systems. The system 100 can operate autonomously or can wirelessly synchronize bin assembly 120 operation among several other assemblies 120 or groups of such assemblies 120 to form one or more feed/intake monitoring networks for coordinated data acquisition and control. One unit is able to operate in a stand-alone manner. Several units in the same vicinity wirelessly link together so that their operation is synchronized and networked. This is shown in FIGS. 4A and 4B.

In FIG. 4A, a livestock feed system 400A is shown that includes two bin assemblies 120 and 120A placed side-by-side (but space may be provided between the two bins as long as within the wireless range of communication devices), and these may be arranged in any order and orientation relative to each other. The two bin assemblies 120, 120A are wirelessly networked together via their separate networking electronics and operation of their own self-contained computers so as to be able to share monitoring and animal management data. Likewise, in FIG. 4B, a livestock feed system 400B is shown that includes three bin assemblies 120, 120A, and 120B again shown side-by-side but may be placed in a more spaced-apart arrangement if desired (e.g., in a triangular or generally circular pattern with the openings for animal heads facing outward). Again, the assemblies 120, 120A, and 120B are communicatively linked in a wireless manner via their networking electronics for sharing monitoring and management data, and the assemblies 120, 120A, and 120B may be arranged in any order since each is self-contained and is wirelessly connected. Assemblies 120A and 120B may take the form as shown in FIGS. 1-3 for assembly 120 and include similar components and operate in a similar manner.

Typical implementations of a system 100, 400A, 400B utilize a wireless data-handling and communication system. Data is backed-up onboard each bin assembly or its controller, and a wireless link periodically downloads data from a computer inside each unit via Wi-Fi, cell-phone, or other links (e.g., Internet-based links) to designated computer facilities anywhere in the world. In addition, when Internet links are available, processed data from each bin assembly 120, 120A, 120B can be sent to a central computer, and feed intakes (e.g., intake 350 from each animal record 340) from each animal can be aggregated.

Each unit 120, 120A, 120B can be individually programmed, interrogated, and directly controlled. Each unit can process its own data at the site of measurements. If external connections are not available, a USB port can be provided for a removable memory stick on each controller 160. The memory stick (or other removable memory 340) may be chosen to be capable of storing a desired amount of data (e.g., more than one year of data) gathered by continuous or periodic use of system 120, 120A, 120B over a period of time. In addition, although it is not the first choice for programming a system 120, 120A, 120B and transferring data to an Internet-enabled device, the controller 160 may be configured to be fully capable of utilizing a standard USB memory stick plugged into a memory stick receptacle onto which operation instructions have been loaded (e.g., the memory 340 may be wholly or partially removable). This design enables the memory stick to be removed and plugged into an Internet-enabled computer so that data can be uploaded to the Internet. In addition, the USB drive can be remotely programmed while it is connected to the Internet or programmed computer, and the instructions can then be then downloaded to the USB drive and transferred via the downloaded USB memory stick to one of the assemblies 120, 120A, 120B and/or to an entire network 120, 120A, and 120B. Although the livestock feed system 100, 400A, and 400B utilizes easily-available and relatively inexpensive USB memory devices for these tasks, other devices of similar purpose could also be used.

The systems 100, 400A, and 400B do not require an additional dedicated on-site computer station for data processing or monitoring or for control (as was the case with prior devices). Each bin assembly 120, 120A, and 120B contains a computer module (e.g., computer 166 of controller 160) for initial data processing and archiving and to provide animal monitoring and management control. The individual computers are linked together in each system 100, 400A, 400B to form designated networks using the Internet, with either standard WiFi, cellular modem, or Ethernet installed in each assembly 120, 120A, 120B (e.g., networking electronics 168 provided in each controller 160). Any Internet-enabled device can be used to provide a pathway to permanent, secure, individualized, data storage on online servers and a pathway to every bin assembly 120, 120A, 120B within a designated animal monitoring/management network to enable remote command and control accessibility for designated users or for each specified animal monitoring/management network.

The monitoring data is safe from most catastrophic losses. For Internet accessible networks, all raw and processed data collected is typically encrypted and downloaded to remote servers and backed up to the Cloud every hour (or other useful time period). If Internet access is not available, all data is automatically securely stored onboard each bin assembly's computer unit. In addition, data is, in some implementations, backed up onto a removable USB memory-stick (or other removable data storage device) and retained for extended indefinite lengths of time. Encrypted data is periodically transmitted through the Internet automatically when Internet access is available. This data is backed-up on designated computers and uploaded to permanent archived storage in the Cloud. The absence of the need for hard-wiring and the presence of a computer module integrated into each bin assembly 120, 120A, 120B for local data logging, data storage, and for programming control of animal monitoring/management operation and data processing provides reliability based on redundancy. Each unit is able to operate regardless of the operation of every other unit in the network and regardless of breaks in network connectivity. Each bin assembly 120, 120A, 120B can even operate in the event that no direct access to the Internet is available. The independent operability of each bin assembly 120, 120A, 120B is a unique feature of the livestock feed systems 100, 400A, 400B described herein.

The livestock feed system are configured for automatic networking. Although each unit or bin assembly is capable of fully-independent operation and wiring to a central computer is not required, multiple units can be automatically configured into a fully-integrated wireless network (e.g., to provide a livestock feed system 400A, 400B). Thus, for example, one bin assembly 120, 120A, or 120B is placed in one pen. At any time, more assemblies can be added and automatically become integrated into the network (e.g., to form a larger livestock feed system). The network will automatically record visits by each animal to any unit or bin assembly and automatically tabulate the total intake received by each animal from any combination of units or bin assemblies.

The data is then displayed on any Internet-enabled device (not shown in FIG. 1-4B) in tabular form using animal monitoring and management software that provides simple intuitive graphics customized to user needs. For example, data for the time that an animal visited any bin assembly, the length of time of the feed bout, the amount of feed consumed during each feed bout, the total number of feed bouts per day, the total feed intake per day for each animal and for the herd, and the change in average feed intake over time for each animal and the herd can all be shown. In addition, customized alerts for animals that display unusual feeding behavior and/or reduced intake can quickly identify animals with potential health problems.

A unique feature of the livestock feed system is that one, or many, bin assemblies or units can be put into operation in the vicinity of a bin assembly or unit and all of the units or bin assemblies will be automatically synchronized to form a designated network or livestock feed system. The network or livestock feed system can then be programmed so that the intake of any animal, even if spread out over one or many units or bin assemblies will be accurately, automatically, and seamlessly quantified by animal monitoring and management software running on one or more of the controllers of the bin assemblies or by a central station computer (e.g., in a farmer's office). No other animal feed intake monitoring system is able to operate as both a series of fully-independent feed intake units and/or as a wireless, multi-unit fully-integrated and/or Internet-enabled animal intake network. If animal intake systems did not automatically synch the RFID reading signal from adjacent feed bins, they could possibly interfere with each other, and the system would not function as intended. The livestock feed system described herein is the only system of which the inventors are aware that accomplishes this using wireless technology.

In some embodiments, the bin assembly is configured so as to integrate a unique smart door (or intelligent access door) assembly or unit into the bin assembly rather than simply having an opening or access as shown at 149 in the front panel 148 of the bin assembly 120 in FIGS. 1 and 2. The smart door assembly locks to control access to the feed bin contents for only designated animals. All other animals are locked out and denied access to the bin contents. When an animal that is authorized to consume a designated amount of bin assembly contents approaches, the smart door unlocks the feed access door, and the animal is able to push it down and out of the way. When the animal has consumed a designated amount of the bin contents as determined by the bin assembly's controller (e.g., via the animal monitoring and management module by determining changes in weight of the bin and its contained feed/supplements), the door is pivoted (e.g., by a door locking and positioning assembly) to shut (e.g., in abutting contact or proximate location with adjacent portions of the front sidewall of the bin) gently but in a manner that positively excludes the animal from accessing the bin.

An easy to use interface can be accessed for each unit or bin assembly such as via an Internet-enabled smart phone or computer terminal by designated users. The interface allows each smart door assembly to be programmed for custom delivery of the bin contents in specified amounts at specified intervals each day. The access door is designed so that when it is unlocked, an animal can push it down to access the bin contents. At a designated time or when a specified amount has been consumed, the door gently pivots upwards due to operation of the door locking and positioning assembly, lifting the animal's head so that the bin contents cannot be accessed.

In some embodiments, each bin assembly is equipped with an air inlet manifold and sensors (e.g., as part of sensor(s) 150 shown in FIG. 1) to gather the breath-based data (data 358 in FIG. 3). These may be configured to be similar (or the same) in function and operation to the emission monitoring system described in U.S. Pat. Nos. 7,966,971 and 8,307,785, which are incorporated by reference herein in their entireties. In brief, during operation of the bin assembly with such a manifold and sensor, air is pulled through the manifold from around the animal's muzzle when an animal inserts its head into the bin via the access door and/or the access opening of the front sidewall. This captures metabolic gases emitted from a ruminant or other animal's tidal breath and/or eructations if present. In addition, a cover can be added to the bin of each bin assembly to further restrict air mixing. If provided, it may be preferred that the cover includes a rigid frame into which a transparent or translucent bubble has been mounted. Hydraulic pistons mounted on each side of the top/cover may be included to make it easy to open for filling with TMR or any forage-based feed. All gas transport, filtering, and sensor and other monitoring systems can be constructed using the principles and instrumental components similar to those used in the two patents discussed above. Additionally, sensor modules to monitor important variables such as air velocity, air temperature, humidity, and concentrations of methane, carbon dioxide, oxygen, hydrogen, hydrogen sulfide and other gases in the tidal breath and/or in the eructations of ruminant or other animals can be used in bin assembly to gather and process the breath-based data. FIG. 1 shows one implementation of a feed bin assembly that may include these breath monitoring components in sensor(s) 150 within or proximate to the interior space of the bin 140.

The livestock feed systems described provide numerous benefits and advantages over prior intake systems. The intake or feed bin 140 is usually fabricated of stainless steel with an access hatch (e.g., rear door or panel 190 in FIG. 1) for the removal of orts or other unwanted material. Stainless steel provides ease of cleaning and sterilization as well as excellent dimensional stability. As shown in FIGS. 1 and 2, the feed bunk or bin 140 is constructed of five panels 142, 144, 145, 146, 148. The mating edges of the panels may be bent at right angles so that they can be shipped flat and fastened together on-site using nuts and bolts, rivets, screws and/or other fastening devices.

One side or the floor/base 142 or of rear sidewall 144 of the feed bunk 140 incorporates an access hatch e.g., the hatch or door 190 shown in rear sidewall 144 in FIG. 1. Preferably, this access hatch or door 190 is a hinged door or a sliding door that can be opened so that the contents of the bunk or bin 140 can be easily removed. The intake feed bunk 140 can be equipped with a weather-tight lid or cover for outdoor operations. The lid is preferably constructed with a rigid frame into which a transparent or translucent bubble or alternatively a panel is placed. Alternatively, an opaque lid with or without interior lighting could be used.

The controller 160 of each bin assembly 120 can be programmed such as remotely via a wireless interface to the computer 166 and its software (module 320 in FIG. 3). The controller 160 can be locally programmed if necessary through the removable USB memory stick or optionally through some other type of removable memory device (either shown as memory 340 of the computer 166 or accessible by the computer 166). Each bin assembly can be operated independently or linked to form designated networks. Each bin assembly can be operated independently and does not require a separate additional computer for operation, data storage, or control.

Each self-contained bin assembly can be easily moved to new locations, and, in this regard, the only external wire that is typically included is for power, which can easily be disconnected for a move. Multiple bin assemblies or units can be wirelessly linked together to form a networked system that automatically keeps track the feed consumption by each individual animal, regardless of the particular assembly or unit or of any combination of assemblies or units where each feed bout takes place. The network/system is configurable and portable, which makes it easy to re-arrange the system layout and configuration. Multiple bin assemblies or units can be configured as desired to form any number of linked multiple arrays of independently controllable/operable assemblies or units. The number of assemblies/units and arrays can change at any time according to the user's needs.

The feed bin assemblies or units automatically and wirelessly sync RFID timing so they do not interfere with each other as they are reconfigured into different configurations. Multiple feed bin assemblies or units can be configured to create a network consisting of independently of independently operable/controllable bins/units. Each bin assembly or unit can be controlled through any Internet-enabled computer where Internet access is available such as through an Ethernet or a cell phone. Each bin assembly/unit controller can process its own raw data using an on-board computer. Each bin assembly/unit can store data on a removable memory device (e.g., a USB memory stick attached to a USB access port). The removable memory device when in the form of a USB memory stick can be placed in the appropriate USB port of an Internet-enabled device or alternatively into any computer equipped with a USB port. Data stored on the USB memory stick or other memory device can be downloaded to a secure archive. If the computer doing such a download can access the Internet, the secure archive can be Cloud-based. Where possible, all data will be uploaded for secure storage on a remote server, series of remote servers, or on a Cloud-based memory backup system.

A memory stick can be removed from controller and placed in the port of any Internet-enabled device, and control instructions (provide the monitoring module or a portion of such module 320) can be downloaded and transferred to the appropriate bin assembly/unit. Alternatively a USB memory stick can be inserted into the USB port of an Internet-enabled computer and remotely programmed or loaded with instructions, which can then be uploaded to the entire network of bin assemblies/units (e.g., whole livestock feed system). In this case, the programmed USB drive can be placed into the controller of each bin assembly/unit to transfer operating and control instructions to each unit. If no Internet-connected device is available, then programs written locally or otherwise stored can be downloaded onto the USB device for transfer to the appropriate feed bin assemblies or units.

A feed bin assembly or unit can be integrated with commercially-available or custom-installed animal control gates to control the specific animals able to access a specific feed bin assembly or unit, to control the specific feeding time, and/or to control the duration of a feed bout. The feed bin assembly/unit can be coupled with commercial animal control gates such as those sold by American Calan Company, and these gates enable specific feed bin assemblies/units to be accessed at specific times of the day. Each controller of the bin assemblies can control either mechanical or electromagnetic moving/pivoting doors where an animal inserts its head to access the interior space of the bin where feed/supplements are stored. The controller of each bin assembly/unit may be programmed to limit the length of time of each feed bout in addition to providing access only to designated animals and/or any animal but only at designated times.

Further, the bin assembly/unit may be coupled with an automatic fill system (not shown in FIGS. 1 and 2 but readily understood by one skilled in the art) to periodically re-fill the feed bin/bunk of the feed bin assembly or unit to the desired weight of material (feed and/or supplements). Automatic fill systems typically include an auger operable to dispense pelleted or granular material. Feedback from the controller (e.g., present weight or change in bin weight) could control the amount dispensed by the automatic fill system. In the same or other implementations, a valve could be used to control liquid material being dispensed via a supply line/tube into the interior space of the bin. As with solid feed/supplements, feedback from the controller could be used to control the amount dispensed. In some cases, a conveyor belt or other apparatus could be used to control the flow of hay, silage or other material with long fibers, and, again, feedback from the bin assembly controller (e.g., change in bin weight) could control the amount dispensed.

The bin assemblies/units are sometimes retrofit with instrumentation and components so that methane, carbon dioxide and other metabolic gas fluxes can be measured. In such cases, the bin can be equipped with an intake manifold, air-handling system, and sensors for metabolic gases including but not limited to methane, carbon dioxide, oxygen, hydrogen, hydrogen sulfide, volatile organic compounds, alcohol, and other gases produced and emitted from the muzzles of ruminants and other animals including sheep, hogs, and horses. The animal monitoring and management systems could then allow total mixed rations, hay, silage, minerals, or any other feed to be used. While the animal is feeding, quantitative measurements of trace gases could be made.

A bin assembly/unit could be used in dairies, feedlots, and tie-stall as well as free-stall barns and pastures. In these bin assemblies/units, some or all of the animal's feed ration could be supplied, and the form of the feed would not be limited to pellets of a specific size. A bin assembly/unit could be used in pasture systems to provide supplemental feed, key minerals, or any other palatable "bait" to attract an animal in order to measure gas emissions from the animal's muzzle.

Figure 5:
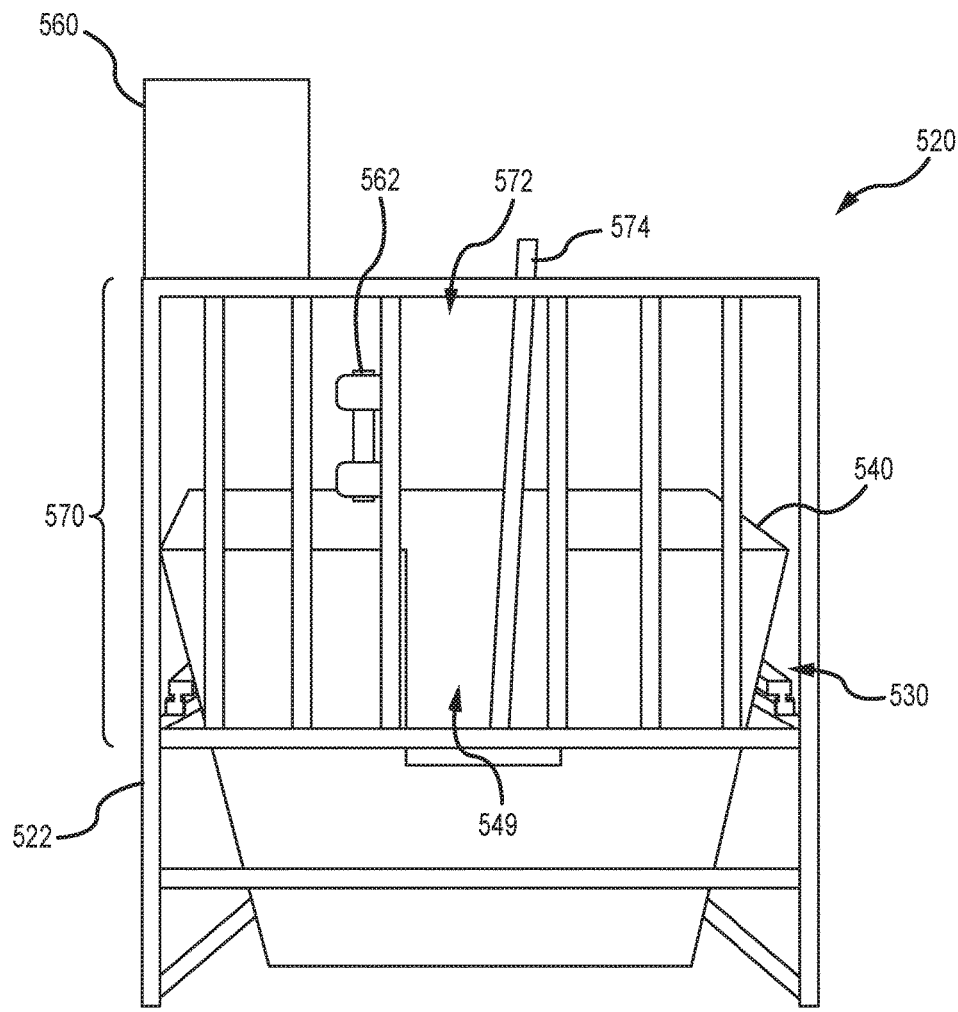
FIGS. 5 and 6 are front and side views, respectively, of another embodiment of a feed bin assembly that may be used alone or in combination with other bin assemblies to provide a feed system of the present description.
Figure 6:
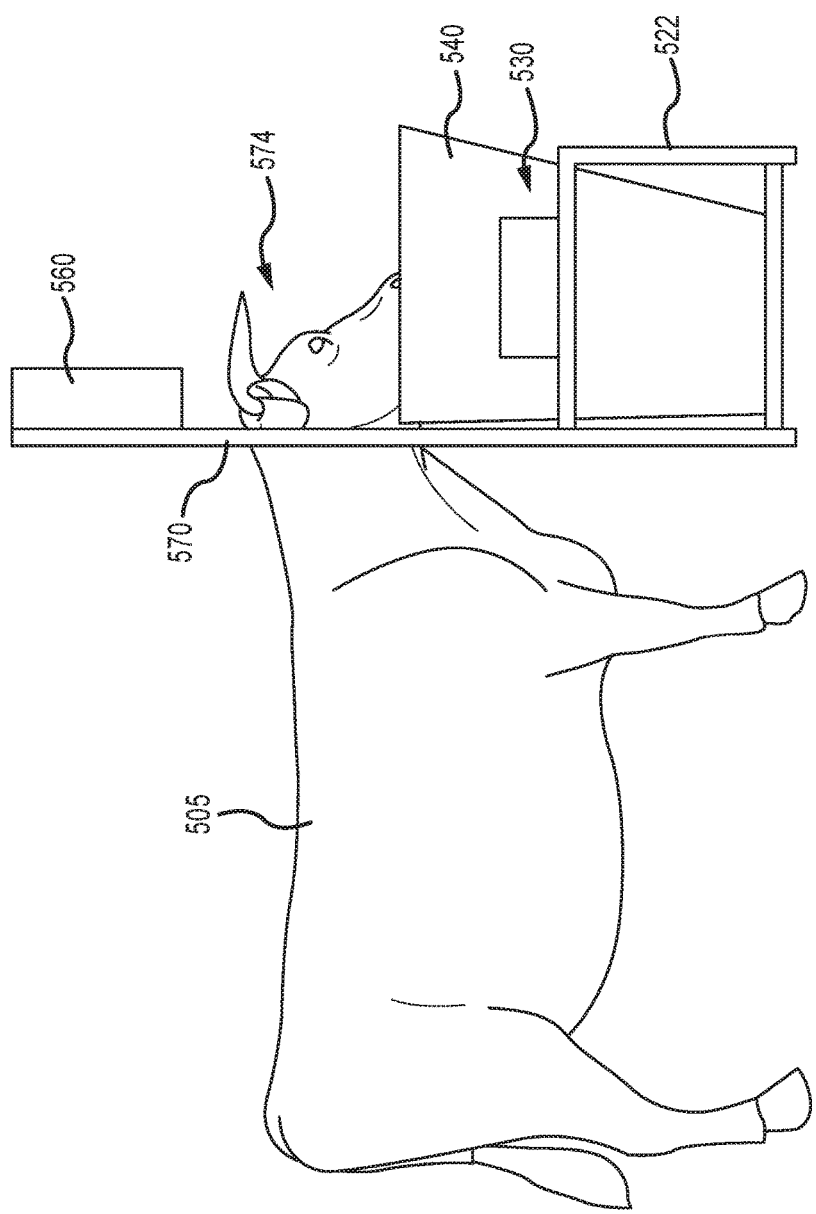

FIGS. 5 and 6 are front and side views of another embodiment of a feed bin assembly 520 that may be used alone or in combination with other bin assemblies to provide a feed system of the present description. As shown, the feed bin assembly includes a support frame 522 upon which one or more load cells 530 are mounted, and a feed bin 540 is received in the support frame 522 so as to be supported upon or abutting the load cells 530. The bin assembly 520 also includes a controller (or electronics and communication box for wireless syncing and processing of monitored animal data) 560 along with an RFID antenna/reader 562. In this embodiment, the controller 560 is mounted on or in an upper portion of the frame support 522 to limit contact and/or damage by the animal 505 accessing the bin assembly 520, and the RFID reader/antenna 562 is mounted in a location to facilitate reading ear tags, colors, or other animal ID devices on the animal 505 while the animal 505 is accessing the bin assembly 520.

The bin assembly 520 includes a gate assembly 570 that may be formed with a number of vertical (and horizontal) bars limiting access to the feed bin to an opening 549 in the bin 540 for the head of the animal 505. To this end, the gate 570 is shown to include an opening 572 aligned with the bin opening 549, and a positionable (rotatable or slidable) bar 574 may be provided on the gate 570 to allow an operator to manually close the opening 572 or to size/shape the opening for a head of the animal 505.

Figure 7:
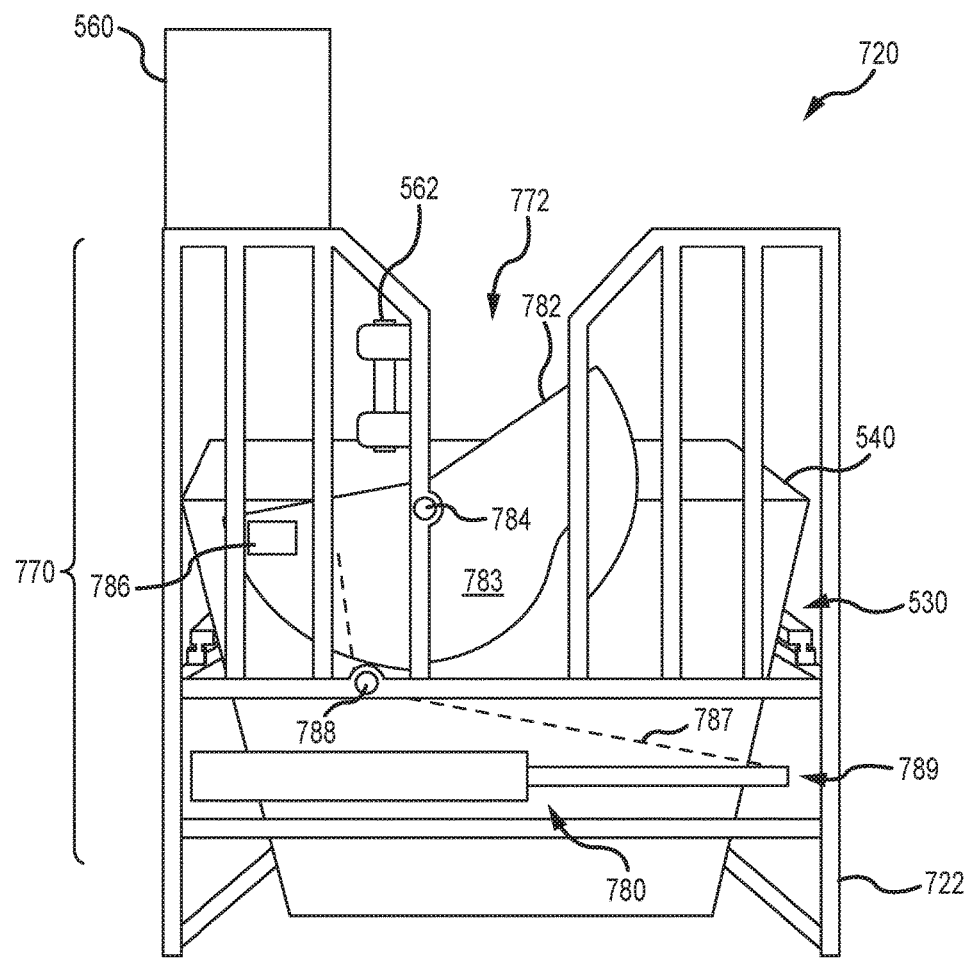
FIGS. 7-9 illustrate front views of another embodiment of a feed bin assembly that includes an automated access door for controlling animal access to the feed bin.
Figure 8:
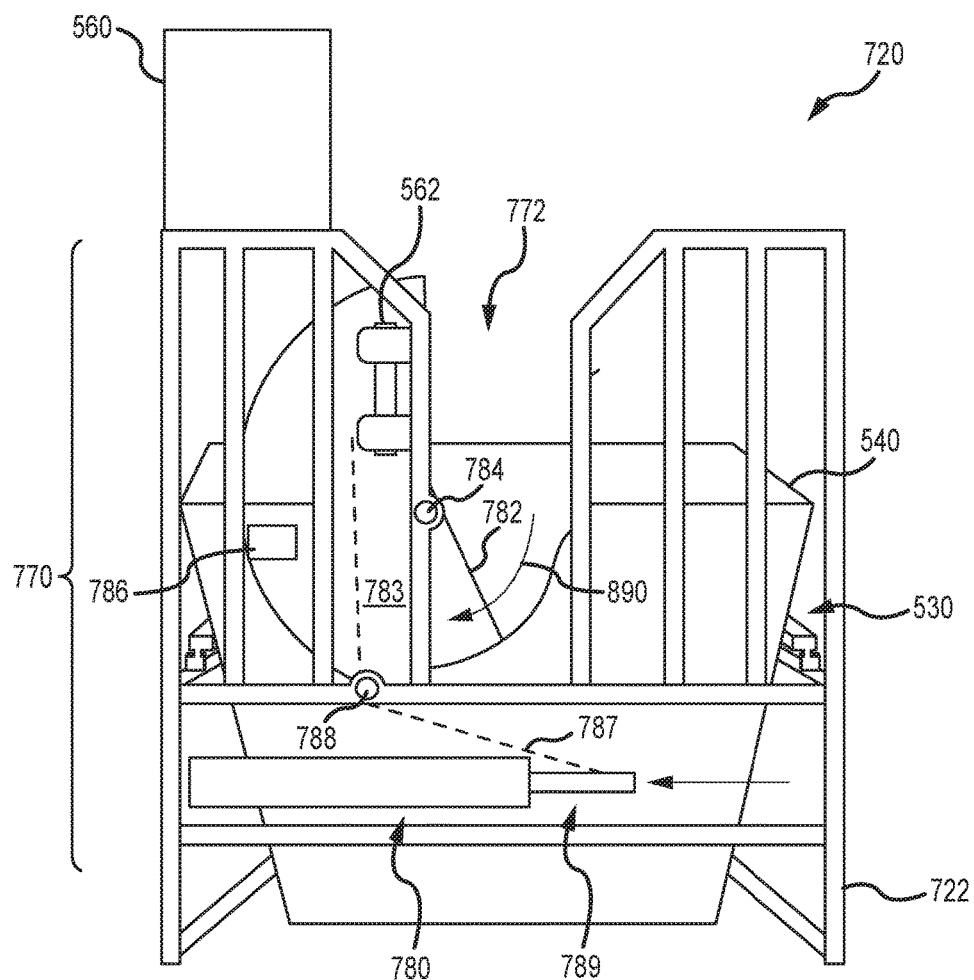
Figure 9:
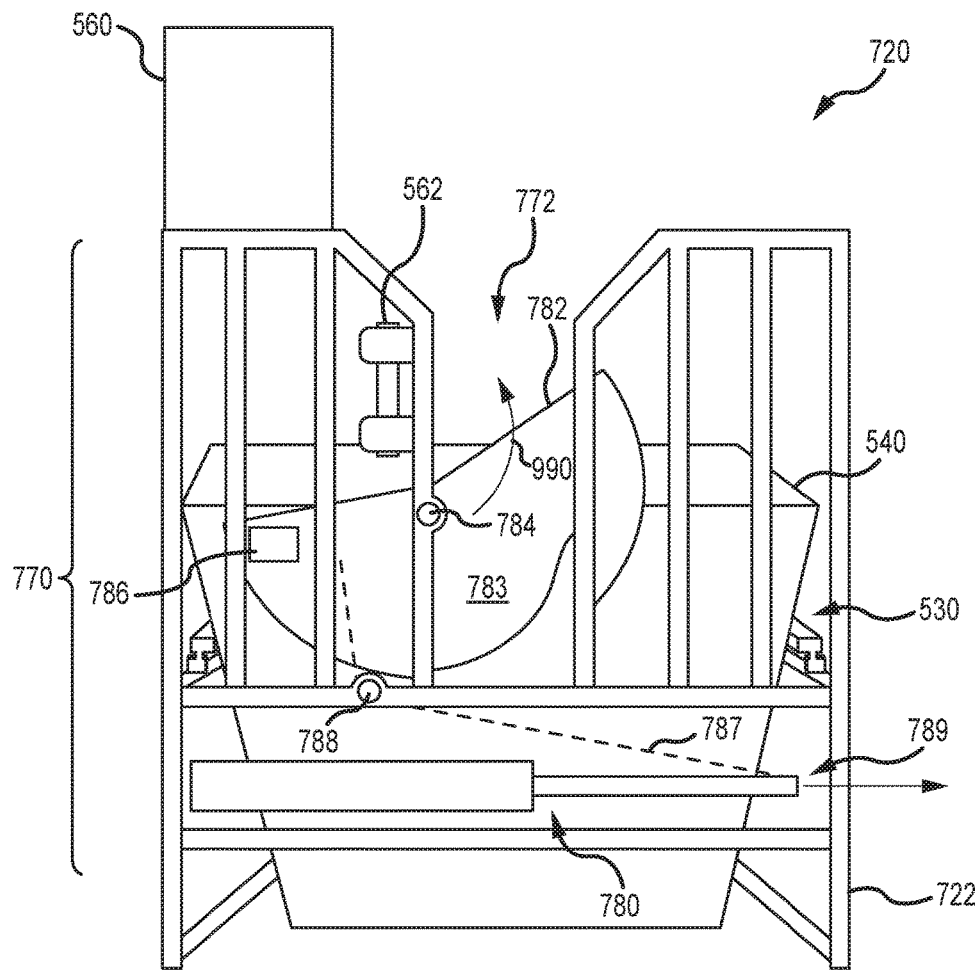

FIGS. 7-9 illustrate another useful embodiment of a feed bin assembly 720 that includes several of the components from the bin assembly 520 including the load cells 530, the feed bin 540, the controller 560, and RFID reader/antenna 562. The bin assembly 720 differs from assembly 520 in its configuration of the support assembly 722. In particular, the support assembly 722 includes a gate 770 with bars/rods defining an opening 772 for an animal head to access the opening in the feed bin 540. To control access to this opening 772 and the bin 540, a bin access control assembly 780 is mounted onto the support frame 722, and the assembly 780 is operable via wireless control signals from the controller 560 to move between a closed/locked state blocking animal access (shown in FIGS. 7 and 9) and an open/unlocked state allowing animal access to the bin 540 (shown in FIG. 8).

The bin access control assembly 780 includes an access door 782 that is pivotally supported on the gate 770 proximate to the animal access opening 772 in the gate 770, such as via door pivot or pin 784 provided on one of the vertical bars of the gate 770. The door 782 may take a variety of shapes with a semi-circular shaped, planar door being shown in FIGS. 7-9 (e.g., a circle with a segment removed). This shape is useful because a blocking portion 783 may be positioned between the opening 772 in the gate 770 and the opening 549 in the bin 540 to block an animal's access to the bin as shown in FIGS. 7 and 9. However, rotation or pivoting of the door 782 about the door pivot 784 causes the blocking portion 783 to be moved to the side of the opening 782 to allow access of the animal through the gate opening 772 to the bin 540. This rotation is shown in FIG. 8 with arrow 890. Once an animal leaves the bin 540 (or is forced away), the door's blocking portion 783 can then again be placed between the two openings 772 and 549 to block animal access with rotation about the door pivot 784 as shown in FIG. 9 with arrow 990.

To provide this selective pivoting and movement, the bin access control assembly 780 includes a door latch 786 that can be unlocked (such by a control signal from the controller 560) to allow opening 890 as shown in FIG. 8 or can be locked (again such as by a control signal from the controller 560) to lock the door 782 in the closed position to block animal access as shown in FIG. 9. Further, the assembly 780 includes a drive or actuator 789 such as mechanical actuator with a piston or arm that is selectively extendable between a withdrawn or door open position as shown in FIG. 8 and an extended or door closed position as shown in FIG. 9.

The actuator 789 is coupled (such as via the exposed/external end of the actuator piston or arm) to the door 782 via a door actuation linkage 787 such that movement of the actuator's arm/piston causes pivoting 890, 990 of the door about pivot 784. To this end, the assembly 780 may include a flexible linkage 787 in the form of a cable, chain, belt, or the like, that moves about pivot 788 on gate 770 to pull the door 782 closed as shown in FIG. 8 or to allow (or push in some cases) the door 782 to swing open as shown in FIG. 9 when the piston/arm of the actuator 789 is withdrawn (such as with pivoting under the weight of the door 782 to pivot about door pivot 784 (counterweighted door 782 to have its "at rest" position be the open position shown in FIG. 8), due to a spring force applied by a spring element(s) not shown but well understood in the mechanical arts, or by other mechanisms).

Although some embodiments are shown to include certain features, the applicant specifically contemplates that any feature disclosed herein may be used together or in combination with any other feature on any embodiment of the invention. It is also contemplated that any feature may be specifically excluded from any embodiment of an invention.

With the above description in mind, it should be clear that the bin assemblies can be "networked" together or "networking" can be implemented in several ways. In one exemplary, but not limiting example, the operator can assign specific animals to a designated bin assembly/unit or to a subset of bin assemblies/units in the network or livestock feed system. In one example, one specific animal could be allowed to only access one specific bin assembly/unit. For example, in all of the animals confined in a group of animals, each animal may have a collar/tag with a specific magnetic key that only allows entry into one specified bin assembly/unit. Alternatively, a system of bin assemblies/units can be networked together so that an animal can utilize any bin assembly/unit in the network, and the data from every feeder/bin assembly in the network will be sent to a designated computer (typically one of the controllers of one of the bin assemblies) where it will be compiled and summed for each animal across all of the feeders/bin assemblies. In an intermediate example, several animals (typically up to seven) could be assigned to utilize a specified bin assembly/unit. In this case, three bin assemblies/units would be required for a herd of twenty-one animals.

The invention claimed is:

1. A livestock feed system, comprising:
   a feed bin including a base and one or more sidewalls engaging edges of the base and extending away in a single direction, wherein the feed bin further includes an opening in a first one of the sidewalls for receiving an animal head and wherein the feed bin further includes an access door on a second one the sidewalls that is coupled to adjacent portions of the one or more sidewalls, the access door blocking access to an interior space defined by the one or more sidewalls when in a closed position and providing access to the interior space when in an open position;

a support frame for receiving and supporting the feed bin; and a controller mounted on the support frame, wherein the controller includes a processor executing code to provide an animal monitoring and management module that causes the controller to determine intake by an animal accessing the feed bin through the opening, and wherein the controller includes memory and an RFID reader reading an RFID tag worn by the animal accessing the feed bin and wherein the animal monitoring and management module stores in the memory a record including an ID of the animal from information read from the RFID tag by the RFID reader and including the intake, wherein the RFID reader is wirelessly linked with one or more additional RFID readers associated with additional feed bin controllers to time synchronize signal transmission of data from each of the RFID readers to the controller to limit signal interference between the RFID reader and the additional RFID readers, wherein the system further comprises one or more sensors in or proximate to the feed bin collecting at least one of lameness data, fly monitoring data, coughing and wheezing data, animal temperature, and animal weight, and wherein the animal monitoring and management module stores in the record entries associated with data from the one or more sensors, whereby, except for a main power cord, the livestock feed system is self-contained, modular, and portable.

2. The system of claim 1, wherein the feed bin comprises stainless steel panels.

3. The system of claim 1, wherein the controller is configured for wirelessly networking with one or more additional feed bins.

4. The system of claim 1, wherein the first one of the sidewalls is a front sidewall containing the opening, wherein the second one of the sidewalls is a rear sidewall including the access door, and wherein the one or more sidewalls comprise right and left sidewalls, wherein the right and left sidewall extend from a first end distal to the base to the edges of the base at an angle in the range of 15 to 45 degrees, and wherein the feed bin is supported by spaced apart first and second members of the support frame with abutting contact with the right and left sidewalls.

5. The system of claim 4, further comprising a pair of load cells positioned on the first and second members of the support frame to mate with the feed bin and wherein the animal monitoring and management module determines the intake by determining a difference between feed bin weight prior to the animal accessing the feed bin and feed bin weight after the animal accessing the feed bin.

6. The system of claim 1, wherein the controller includes networking electronics and wherein the animal monitoring and management module is programmable via a memory device removable from the controller or remotely through a wireless communication with the networking electronics.

7. The system of claim 1, further comprising a control gate mounted for pivoting between a closed position blocking the opening and an open position allowing access to the opening and the feed bin and further comprising a gate positioning mechanism selectively operable by the controller to move the control gate between the open and closed positions to control access to the feed bin.

8. The system of claim 7, wherein the controller selectively positions the control gate based on a determination by the animal monitoring and management module of one of animal ID, length of present access to the feed bin, present time, and present date.

9. The system of claim 1, wherein the lameness data includes two or more weights concurrently applied by the animal, while accessing the feed bin, on two or more of the one or more sensors.

10. An apparatus for monitoring animals, comprising:

a first bin assembly comprising a feed bin, a support frame supporting the feed bin, and a controller including a housing, a computer within the housing, an RFID reader, and networking electronics; and a second bin assembly comprising a feed bin, a support frame supporting the feed bin, and a controller including a housing, a computer within the housing, an RFID reader, and networking electronics, wherein the computers of the first and second bin assemblies process data from the RFID readers to identify animals accessing the feed bins and to track feed consumption from the feed bins by each of the animals, wherein the first and second bin assemblies are networked together via wireless communications between the networking electronics of the first and second bin assemblies, wherein the RFID readers of the first and second bin assemblies are wirelessly linked and the computers synchronize timing of signal transmission operations of the RFID readers of the first and second bin assemblies during data transfer from the RFID readers to the computers to limit interference between the RFID readers, and wherein the apparatus further comprises one or more sensors in or proximate to each of the first and second bin assemblies sensing data for monitoring health characteristics of the identified animals accessing the feed bins.

11. The apparatus of claim 10, where the first and second bin assemblies are further networked to a server, remote from the first and second bin assemblies, via communications between the networking electronics of the first and second bin assemblies and wireless communication electronics of the server.

12. The apparatus of claim 10, wherein the feed consumption is a sum of feed consumption at the first bin assembly and at the second bin assembly.

13. The apparatus of claim 10, wherein the networking electronics of both the first and second bin assemblies operate to wirelessly receive control signals from a remote device via a communications network, whereby operations of the computers are independently and remotely controlled and whereby data stored in memory of the computers is accessible from the remote device.

14. The apparatus of claim 10, wherein the feed bins each include stainless steel sidewalls with an access door in one of the sidewalls that is mounted for selective opening and closing to facilitate cleaning of an inner space of each of the feed bins.

15. The apparatus of claim 10, further including one or more sensors sensing wherein the one or more sensors sense at least one of lameness data, fly monitoring data, animal temperature, animal weight, and breath-based data and wherein the computer stores, in local memory, at least a portion of this sensed data sensed by the one or more sensors with the tracked feed consumption on an animal-by-animal basis.

16. The apparatus of claim 10, further including at least a third bin assembly configured similar to the first bin assembly and adapted to be networked via wireless communications with networking electronics to the first and second bin assemblies.

17. The system of claim 16, further comprising a control gate mounted for pivoting between a closed position blocking the opening and an open position allowing access to the opening and the feed bin and further comprising a gate positioning mechanism selectively operable by the controller to move the control gate between the open and closed positions to control access to the feed bin.

18. The system of claim 17, wherein the controller selectively positions the control gate based on a determination by the controller of one of animal ID, length of present access to the feed bin, present time, and present date.

19. A livestock feed system, comprising:
- a feed bin including an opening on a first surface for receiving an animal head and wherein the feed bin further includes an access door on a second surface blocking access to an interior space defined by the one or more sidewalls when in a closed position and providing access to the interior space when in an open position;
- a support frame for receiving and supporting the feed bin upon one or more load cells; and
- a controller, including a water-resistant housing attached to the support frame, determining intake by an animal accessing the feed bin through the opening based on processing of signals from the one or more load cells, wherein the feed bin includes one or more sidewalls comprising stainless steel panels, wherein the controller includes memory and an RFID reader reading an RFID tag worn by the animal accessing the feed bin and wherein the controller stores in the memory a record including an ID of the animal from information read from the RFID tag by the RFID reader and including the intake, wherein the RFID reader is wirelessly linked with one or more additional RFID readers associated with additional feed bin controllers to time synchronize signal transmission of data from each of the RFID readers to the controller to limit signal interference between the RFID reader and the additional RFID readers, and wherein the livestock feed system further comprises one or more sensors in or proximate to each of the feed bin sensing data for monitoring health characteristics of the animal accessing the feed bin.

20. The system of claim 19, wherein the controller includes networking electronics and wherein the controller is programmable via a memory device removable from the controller or remotely through a wireless communication with the networking electronics.

21. The system of claim 19, further including wherein the one or more sensors in or proximate to the feed bin collecting collect at least one of lameness data, fly monitoring data, coughing and wheezing data, animal temperature, and animal weight and wherein the controller stores, in local memory, in the record entries associated with data from the one or more sensors.

* * * * *